(12) United States Patent
Okamoto

(10) Patent No.: US 9,965,227 B2
(45) Date of Patent: May 8, 2018

(54) IMAGE PROCESSING APPARATUS, IMAGE PROCESSING METHOD, COMPUTER-READABLE RECORDING MEDIUM, PRINTING SYSTEM, AND METHOD OF PRODUCING PRINTED MATERIAL

(71) Applicant: FUJIFILM Corporation, Tokyo (JP)

(72) Inventor: Takahiro Okamoto, Tokyo (JP)

(73) Assignee: FUJIFILM CORPORATION, Tokyo (JP)

( * ) Notice: Subject to any disclaimer, the term of this patent is extended or adjusted under 35 U.S.C. 154(b) by 405 days.

(21) Appl. No.: 13/916,527

(22) Filed: Jun. 12, 2013

(65) Prior Publication Data

US 2013/0335753 A1 Dec. 19, 2013

(30) Foreign Application Priority Data

Jun. 15, 2012 (JP) ................. 2012-135796

(51) Int. Cl.
*G06F 3/12* (2006.01)
*G06F 11/07* (2006.01)

(52) U.S. Cl.
CPC ............ *G06F 3/1211* (2013.01); *G06F 3/121* (2013.01); *G06F 3/1244* (2013.01); *G06F 3/1285* (2013.01); *G06F 11/0793* (2013.01); *G06F 11/0733* (2013.01)

(58) Field of Classification Search
CPC ......... H04N 1/409; G06K 15/02; G06F 11/26
See application file for complete search history.

(56) References Cited

U.S. PATENT DOCUMENTS

| 2001/0007138 | A1* | 7/2001 | Iida ..................... G06F 11/0709 714/25 |
| 2007/0188815 | A1* | 8/2007 | Donovan ........... H04N 1/00002 358/3.26 |
| 2012/0026546 | A1* | 2/2012 | Miura ..................... B41J 2/175 358/1.15 |

FOREIGN PATENT DOCUMENTS

JP 2008-008841 A 1/2008

* cited by examiner

*Primary Examiner* — Frantz Bataille
(74) *Attorney, Agent, or Firm* — McGinn I.P. Law Group, PLLC.

(57) ABSTRACT

An image processing apparatus configured to correct image data for printing includes: a defect image data acquisition unit configured to acquire defect image data indicating image information of a printer defect appearing on a printed material due to a printer; a print target image data input unit configured to acquire print target image data to be printed by the printer; a defect similar component extraction unit configured to extract a defect similar component, which is similar to the defect image data, from the print target image data; and a defect similar component subtraction unit configured to subtract the defect similar component from the print target image data.

20 Claims, 15 Drawing Sheets

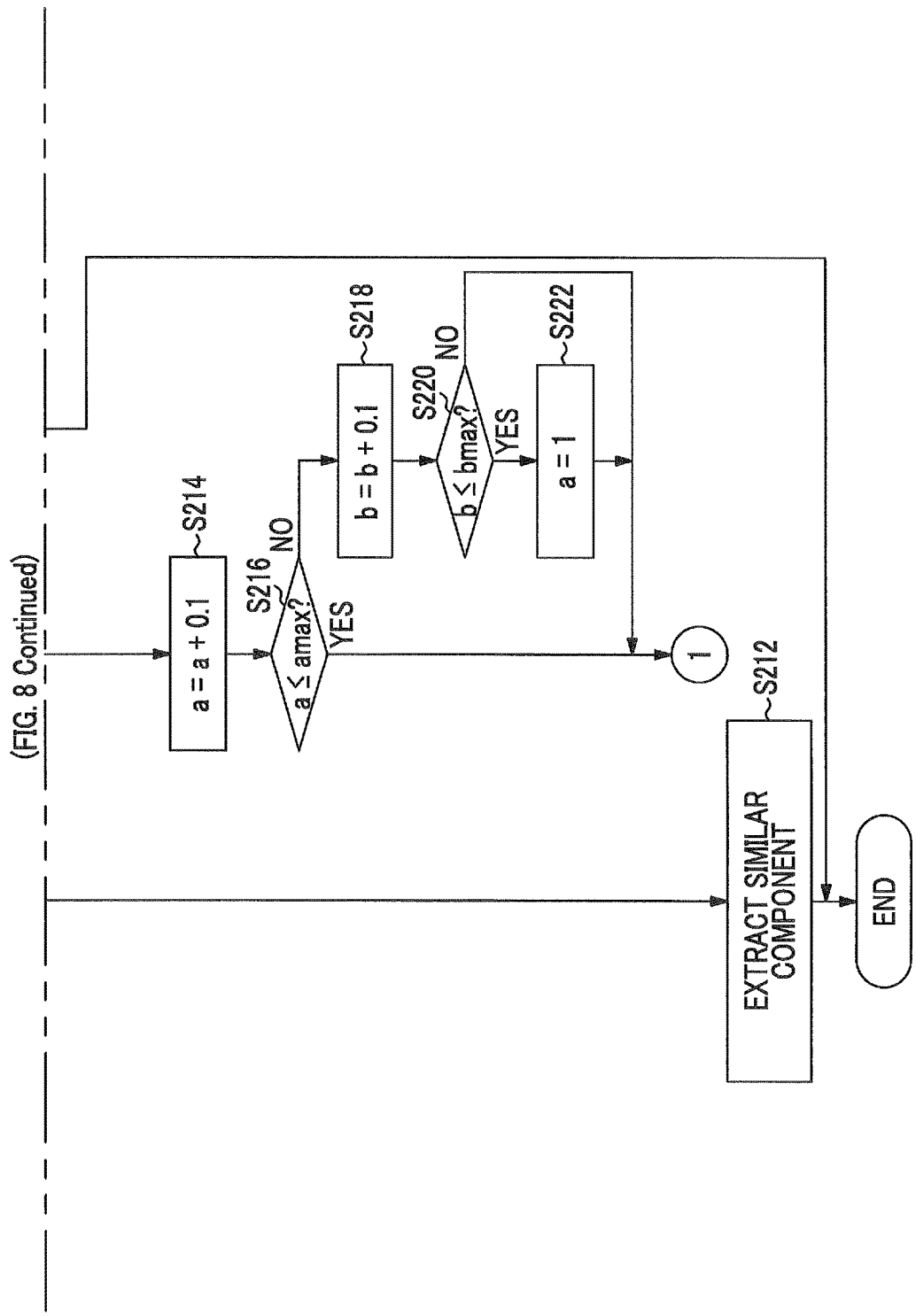

INPUT IMAGE Iin(x, y)

IMAGE PROCESSING Ni(x, y)

Δ(x, y)

PRINTER DEFECT Np(x, y)

PRINTED MATERIAL Iout(x, y)

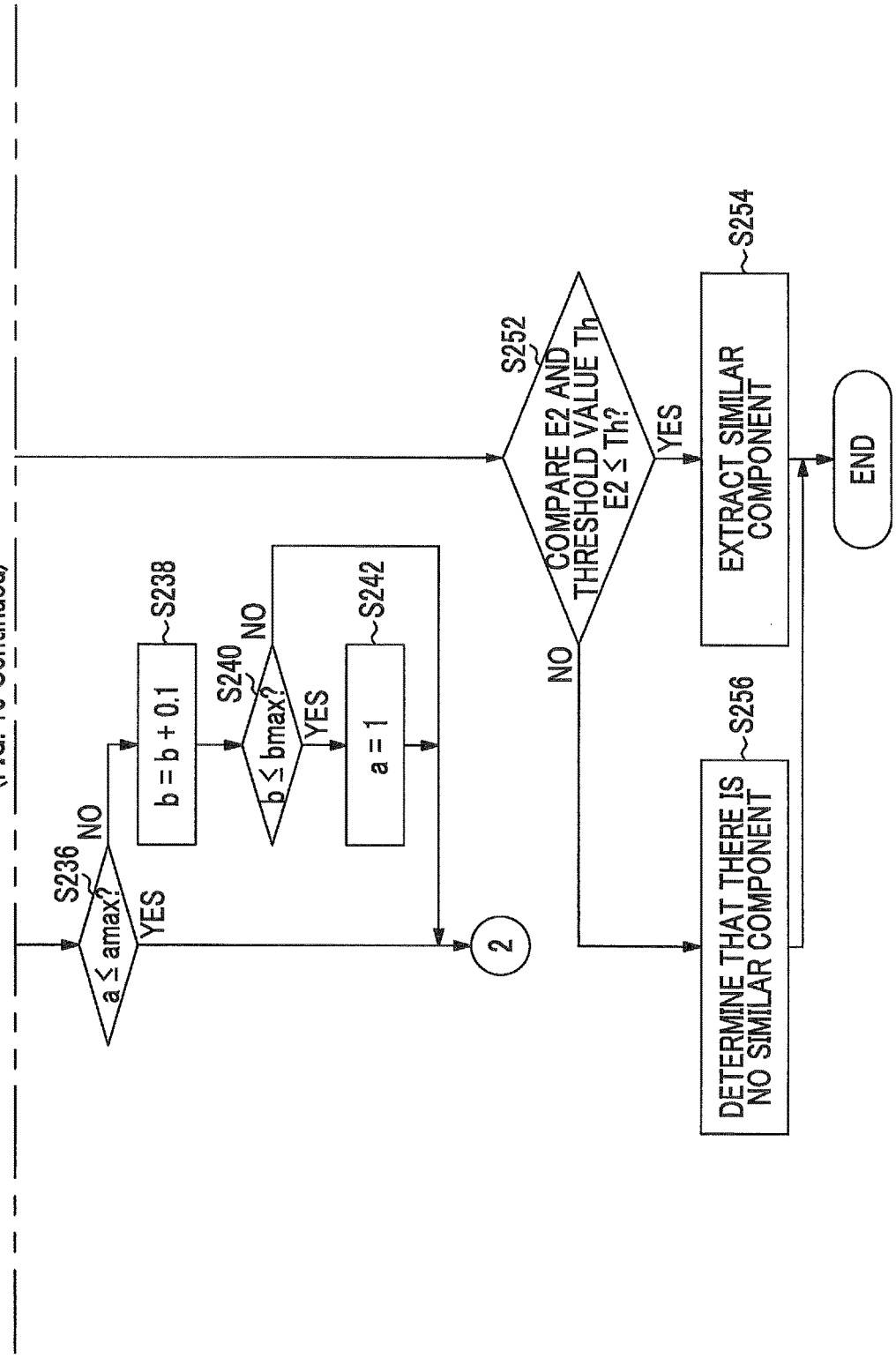

INPUT IMAGE Iin(x, y)

IMAGE PROCESSING Ni(x, y)

Δ(x, y)

PRINTER DEFECT Np(x, y)

PRINTED MATERIAL Iout(x, y)

E > Th

E > Th

E > Th

E ≤ Th

ICNAME PROCESSING APPARATUS, IMAGE
PROCESSING METHOD,
COMPUTER-READABLE RECORDING
MEDIUM, PRINTING SYSTEM, AND
METHOD OF PRODUCING PRINTED
MATERIAL

BACKGROUND OF THE INVENTION

1. Field of the Invention

The present invention relates to an image processing apparatus, an image processing method, a computer-readable recording medium, a printing system, and a method of producing printed material and in particular, to an image data processing technique for performing printing using a printer (printing apparatus).

2. Description of the Related Art

JP2008-8841A discloses a printed material inspection method and a printed material inspection system for performing quality determination of a printed material produced by a printing machine. The method disclosed in JP2008-8841A is a printed material inspection method of performing quality determination of a printed material based on a master image as a reference for quality determination and an image obtained by capturing the printed material using an imaging unit. In this method, the density level of an area image of the master image is compared with the density level of an area image of a print image corresponding to the area image, and the portion is detected as a defective spot if the difference between the compared density levels is equal to or greater than the allowable value set in advance.

SUMMARY OF THE INVENTION

However, when the defect of the printed material is due to the printer, it is not sufficient to simply detect a defective spot. For example, when the defect of a printed material is detected, it is necessary to interrupt the printing operation in order to perform adjustment, maintenance, or the like of the printing machine. For this reason, the operating rate is reduced and the productivity becomes poor. Therefore, a method is desired according to which the printing processing is continued as far as possible within the range that is not deemed to be defective printing even when a defect due to the printer occurs.

The claimed invention has been made in view of such a situation, and it is an object of the claimed invention to provide an image processing apparatus, an image processing method, a printing system, a computer-readable recording medium, and a method of producing a printed material that enables appropriate image reproduction even in case where there is a defect due to a printer.

In order to achieve the object, the following invention is provided.

According to a first aspect of the present invention, there is provided an image processing apparatus configured to correct image data for printing, the image processing apparatus including: a defect image data acquisition unit configured to acquire defect image data indicating image information of a printer defect appearing on a printed material due to a printer; a print target image data input unit configured to acquire print target image data to be printed by the printer; a defect similar component extraction unit configured to extract a defect similar component, which is similar to the defect image data, from the print target image data; and a defect similar component subtraction unit configured to subtract the defect similar component from the print target image data.

According to this aspect, when a component similar to the defect image data of a printer defect (defect similar component) is included in the print target image data to be printed by the printer, the defect similar component is subtracted from the print target image data. When the printer performs printing using the image data obtained by subtracting the defect similar component from the print target image data, image information of the printer defect due to the printer is added to the obtained printed material (defect similar component is replaced with an image of a printer defect).

Instead of the defect similar component included in the print target image data, the information of the printer defect is added to the image portion of the defect similar component. Therefore, image reproduction similar to the original print target image data can be realized.

The term "printer" is a general term of various printing apparatuses (printing machines) and image forming apparatuses regardless of a printing method and the apparatus size. The term "printer" includes the meaning of a printing machine, a printing apparatus, an image forming apparatus, an image recording apparatus, an image output apparatus, and the like.

In addition, the image processing apparatus according to the first aspect of the present invention may be realized by one or more computers.

According to a second aspect of the present invention, in the image processing apparatus according to the first aspect of the present invention, the defect image data acquisition unit may include a defect detection unit configured to generate the defect image data by detecting the printer defect from print image data obtained by reading a print image of a test chart printed by the printer.

As an aspect to acquire the defect image data indicating the image information of a printer defect, it is possible to print a test chart for defect detection, read the printing result using an image reader, and generate defect image data from the print image data that is the electronic image data of the read image. A configuration is preferable in which the generated defect image data is stored in storage means, such as a memory.

According to a third aspect of the present invention, in the image processing apparatus according to the second aspect of the present invention, the defect detection unit may obtain the defect image data by subtracting an image data component of the test chart from the print image data.

A component (defect image data) of the printer defect can be acquired by subtracting a component of the original image data of the test chart from the print image data that is data of the read image obtained by reading the print image of the test chart.

According to a fourth aspect of the present invention, in the image processing apparatus according to any one of the first to third aspects of the present invention, the defect similar component extraction unit may determine whether or not the defect similar component is present by calculating an evaluation value according to a similarity evaluation function defined in advance and comparing the calculated evaluation value with a threshold value set in advance.

For example, when a similarity evaluation function is defined in which the evaluation value decreases as the similarity between compared images increases, determination as a defect similar component is made when the calculated evaluation value is smaller than the threshold value.

According to a fifth aspect of the present invention, in the image processing apparatus according to any one of the first to fourth aspects of the present invention, the defect similar component extraction unit may extract, as the defect similar component, an image component, which has a deformed shape of "a" times in a first direction and "b" times in a second direction perpendicular to the first direction within an image plane with respect to a defect image portion indicated by the defect image data wherein a and b are positive numbers.

For example, an x direction of a two-dimensional image can be set as the first direction, and a y direction perpendicular to the x direction can be set as the second direction. When performing determination regarding a component similar to a printer defect, it can be determined that an image component (for example, texture), which has a shape equivalent to deformation of "a" times in the first direction and "b" times in the second direction by using transformation processing of making an image "a" times in the first direction and "b" times in the second direction within the image plane, is similar to the printer defect. The range of the value that can be taken for "a" and "b" is set from the range of the similarity allowed, appropriate "a" and "b" are searched for within the range, and extraction as a defect similar component is performed when "a" and "b" satisfying predetermined conditions are present.

In addition, a defect similar component can be extracted using a process of rotating an image within the image plane, a process of performing parallel movement of an image within the image plane, or a process based on the appropriate combination of these processes without being limited to the transformation processing of "a" times in the first direction and "b" times in the second direction.

According to a sixth aspect of the present invention, in the image processing apparatus according to any one of the first to fifth aspects of the present invention, the defect similar component extraction unit may extract an image component, which has a shape obtained by rotating a defect image portion indicated by the defect image data within the image plane, as the defect similar component.

According to a seventh aspect of the present invention, in the image processing apparatus according to any one of the first to sixth aspects of the present invention, the defect similar component extraction unit may determine whether or not the defect similar component is present by changing relative positional relationship between a defect region of the defect image data and the print target image data.

This aspect is useful when the position of a defect region of defect image data does not match the position of a defect similar component in print target image data.

According to an eighth aspect of the present invention, there is provided an image processing method of correcting image data for printing, the image processing method including: a defect image data acquisition step of acquiring defect image data indicating image information of a printer defect appearing on a printed material due to a printer; a print target image data input step of acquiring print target image data to be printed by the printer; a defect similar component extraction step of extracting a defect similar component, which is similar to the defect image data, from the print target image data; and a defect similar component subtraction step of subtracting the defect similar component from the print target image data.

For the image processing method according to the eighth aspect of the present invention, the same characteristics as in the second to seventh aspects of the present invention can be appropriately combined. In this case, matters specified as a "unit" can be grasped as a "process" or "step" corresponding to the operation, processing, and function of the unit.

According to a ninth aspect of the present invention, there is provided a non-transitory computer-readable recording medium having a program embedded thereon causing a computer to implement an image processing function of correcting image data for printing. The program causes the computer to function as: a defect image data acquisition unit configured to acquire defect image data indicating image information of a printer defect appearing on a printed material due to a printer; a print target image data input unit configured to acquire print target image data to be printed by the printer; a defect similar component extraction unit configured to extract a defect similar component, which is similar to the defect image data, from the print target image data; and a defect similar component subtraction unit configured to subtract the defect similar component from the print target image data.

By the non-transitory computer-readable recording medium having a program embedded thereon according to the ninth aspect of the present invention, one or more computers can be made to function as an image processing apparatus. For the non-transitory computer-readable recording medium having a program embedded thereon according to the ninth aspect of the present invention, the same features as in the second to seventh aspects can be appropriately combined. In this case, a function specified as a "unit" can be grasped as a program to be realized by the computer.

According to a tenth aspect of the present invention, there is provided a printing system including: the image processing apparatus according to any one of the first to seventh aspects of the present invention; and a printer. Printing of the printer is performed based on image data after defect similar component subtraction obtained by subtracting the defect similar component from the print target image data using the defect similar component subtraction unit of the image processing apparatus.

According to an eleventh aspect of the present invention, in the printing system according to the tenth aspect of the present invention, an image reader configured to read a print image of a printed material printed by the printer is further included, and the defect image data is generated from print image data obtained by reading a print image of a test chart printed by the printer using the image reader.

According to a twelfth aspect of the present invention, there is provided a method of producing a printed material, the method including: a test chart printing step of printing a test chart using a printer; a print image data acquisition step of reading a print image of the test chart, which has been printed in the test chart printing step, using an image reader to acquire print image data of the read print image; a defect image data acquisition step of acquiring defect image data, which indicates image information of a printer defect appearing on a printed material due to a printer, from the printed image data; a print target image data input step of acquiring print target image data to be printed by the printer; a defect similar component extraction step of extracting a defect similar component, which is similar to the defect image data, from the print target image data; a defect similar component subtraction step of subtracting the defect similar component from the print target image data; and a printing step of performing printing using the printer based on image data after defect similar component subtraction obtained by subtracting the defect similar component from the print target image data in the defect similar component subtraction step.

For the method of producing a printed material according to the twelfth aspect of the present invention, the same characteristics as in the second to seventh aspects of the present invention can be appropriately combined. In this case, matters specified as a "unit" can be grasped as a "process" or "step" corresponding to the operation, processing, and function of the unit.

According to the present invention, when printing the print target image data including a component similar to a printer defect due to a printer, the defect similar component is subtracted from the print target image data, and printing can be performed using the image data after defect similar component subtraction. Therefore, since an image component of a printer defect is added at the time of printing, image reproduction similar to the original print target image data can be realized.

DESCRIPTION OF THE PREFERRED EMBODIMENTS

Hereinafter, embodiments for implementing the present invention will be described in detail with reference to the accompanying drawings.

Figure 1:
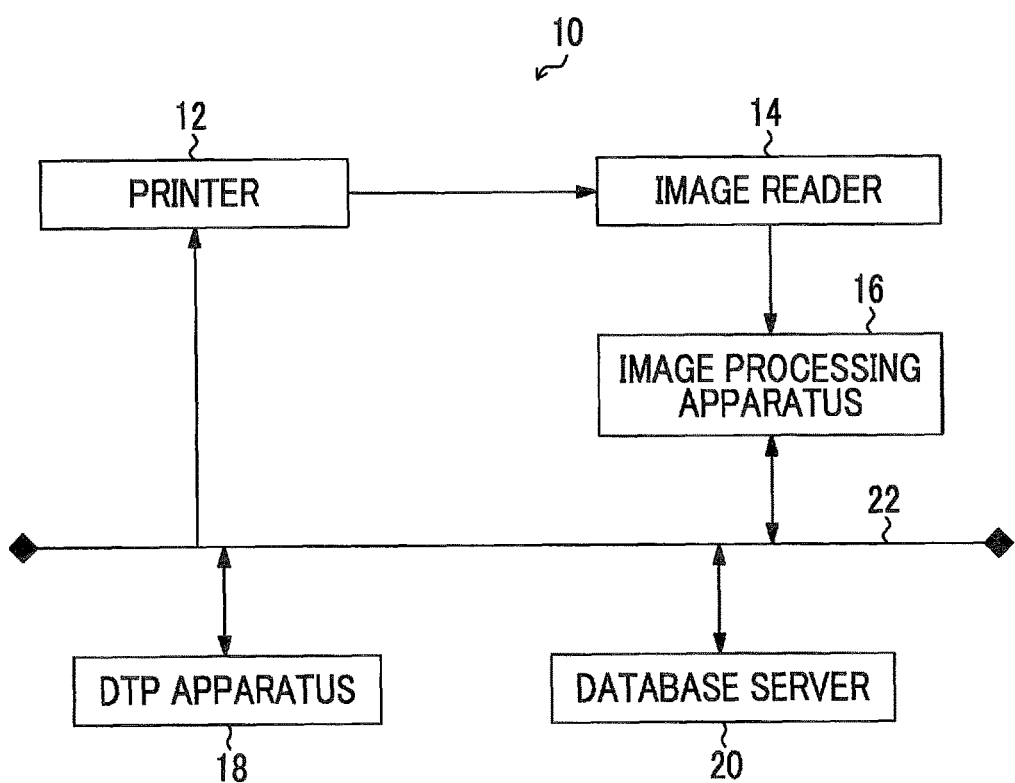
FIG. 1 is a diagram showing the overall configuration of a printing system to which an image processing apparatus according to an embodiment of the present invention is applied.

FIG. 1 is a diagram showing the overall configuration of a printing system to which an image processing apparatus according to an embodiment of the present invention is applied. This printing system 10 is configured to include a printer 12 as an image forming apparatus, an image reader 14, an image processing apparatus 16, a DTP (Desk Top Publishing) apparatus 18, and a database server 20. The printer 12 is connected to a communication network 22, such as a LAN (Local Area Network), and is connected to the image reader 14, the DTP apparatus 18, and the database server 20 through the communication network 22.

The communication network 22 may be a cable network or a wireless network, or may be a combination of these. In addition, a wide area communication network, such as the Internet, may be used as the communication network 22.

Not only digital printing machines represented by an ink jet printer, an electrophotographic printer, and the like but also various types of printing apparatuses (image forming apparatuses) including a printing apparatus using a printing plate, such as an offset printing machine, may be adopted as the printer 12. In addition, in the case of a printing apparatus using a printing plate, a plate-making apparatus such as a plate recorder, its controller, a printing apparatus that performs printing using a printing plate created by the plate-making apparatus, and the like are connected to the communication network 22.

The image reader 14 is means for reading an image of a printed material printed by the printer 12 and generating electronic image data indicating the read image. The image reader 14 includes an imaging element (photoelectric conversion element), which captures an image (print image) of a printed material and converts the image information into an electrical signal, and a signal processing circuit, which processes a signal obtained from the imaging element to generate digital image data. As the image reader 14, it is possible to use a scanner separate from the printer 12 (for example, a so-called off-line scanner that is available in off-line, such as a flatbed scanner). In addition, the image reader 14 may be built into the printer 12. For example, a line sensor for image reading (imaging unit) may be provided on the paper transport path of the printer 12 and thereby a print image is read with the line sensor while transporting the printed material on which image has been formed. The read image data of the print image generated by the image reader 14 (hereinafter, referred to as "print image data") is input to the image processing apparatus 16.

The image processing apparatus 16 has a function of analyzing the print image data, a function of processing and converting the image data of a print target to be printed by the printer 12, and the like. A target image is printed by inputting the image data generated by the image processing apparatus 16 to the printer 12. Details of the image processing apparatus 16 will be described later.

The DTP apparatus 18 is an apparatus that performs the creation, editing, and the like of a print document. The image processing apparatus 16 or the DTP apparatus 18 may be realized by one or more computers. It is also possible to realize the function of the image processing apparatus 16 and the function of the DTP apparatus 18 using one apparatus (computer).

One or a plurality of items of image data to be printed by the printer 12, data (customer management data) of a user or a customer who uses the printing system 10, management data of the printer 12 connected to the printing system 10, and the like are stored in the database server 20. The database server 20 may be realized by one or more computers.

<Explanation of an Image Processing System>

Figure 2:
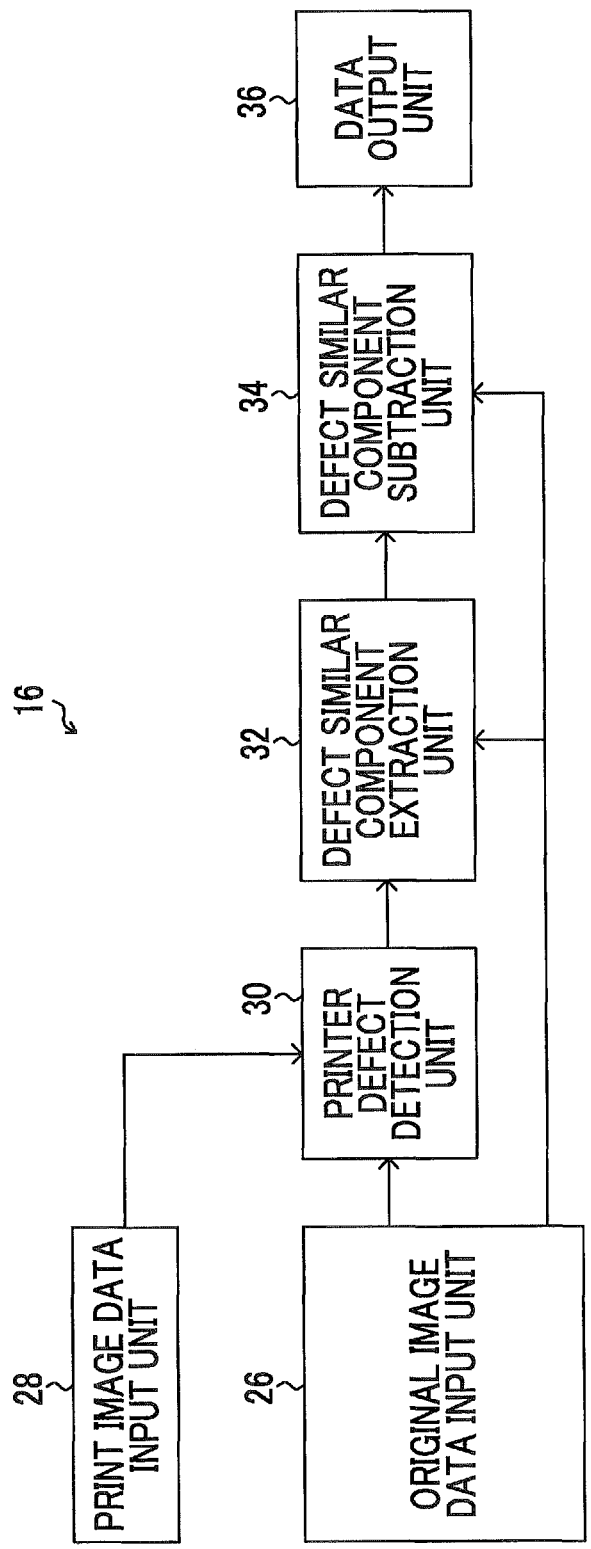
FIG. 2 is a block diagram showing the main configuration of an image processing apparatus.

FIG. 2 is a block diagram showing the main configuration of the image processing apparatus 16. The image processing apparatus 16 includes an original image data input unit 26, a print image data input unit 28, a printer defect detection unit 30, a defect similar component extraction unit 32, a defect similar component subtraction unit 34, and a data output unit 36. The original image data input unit 26 is a data input interface unit that functions as a data acquisition unit for acquiring the original image data (corresponding to "print target image data") of a print target to be printed (output) by the printer 12 (refer to FIG. 1). As the original image data input unit 26, a cable communication interface unit or a wireless communication interface unit may be adopted, or a media interface unit that performs reading and writing of an external storage medium (removable disk), such as a memory card, may be adopted, or a combination of these may be adopted.

The print image data input unit 28 may be a data input interface unit that functions as a data acquisition unit for acquiring the data (print image data) of the read image generated by the image reader 14 (refer to FIG. 1). As the print image data input unit 28, a cable communication interface unit or a wireless communication interface unit may be adopted, or a media interface unit that performs reading and writing of an external storage medium (removable disk), such as a memory card, may be adopted, or a combination of these may be adopted. The print image data input unit 28 may also be used as the original image data input unit 26.

The printer defect detection unit 30 performs processing of detecting a component of a defect due to the printer 12 (hereinafter, referred to as a "printer defect" or a "defect image") from the print image data acquired through the print image data input unit 28. For example, when a single pass type ink jet printer is used as the printer 12 (refer to FIG. 1), streaks in a direction parallel to the paper transport direction (sub-scanning direction) appear on the print image due to abnormal discharge (discharge failure, abnormal discharge rate, abnormal discharge direction, and the like) of a specific nozzle in the ink jet head. An image portion (striped texture) of such streaks is detected as a printer defect.

Based on the information of the printer defect detected by the printer defect detection unit 30 and the original image data of the print target (hereinafter, also referred to as "print target original image data") acquired through the original image data input unit 26, the defect similar component extraction unit 32 performs processing of extracting a component similar to the texture of the printer defect from the print target original image data. The component similar to the printer defect may be referred to as a "defect similar component", and the texture may be referred to as a "defect similar image".

The defect similar component subtraction unit 34 performs processing of subtracting a defect similar component (pixel value of a region similar to a printer defect) from the print target original image data acquired through the original image data input unit 26.

The data output unit 36 is a data output interface unit that outputs to the outside the image data generated by the defect similar component subtraction unit 34 (referred to as "image data after defect similar component subtraction") or image data obtained by further processing the image data. The data output unit 36 may be configured by a communication interface unit for connecting the image processing apparatus 16 to the communication network 22 (refer to FIG. 1).

The combination of the print image data input unit 28 and the printer defect detection unit 30 corresponds to a "defect image data acquisition unit". The printer defect detection unit 30 corresponds to a "defect detection unit". The original image data input unit 26 corresponds to a "print target image data input unit".

According to the image processing apparatus 16 shown in FIG. 2, an image component of a printer defect (printer defect image) is obtained by the printer defect detection unit 30 based on the input print target original image data and the print image data of the gray chart read by the image reader 14 (refer to FIG. 1). The printer defect image generated by the printer defect detection unit 30 is transmitted to the defect similar component extraction unit 32.

The defect similar component extraction unit 32 generates image data of the defect similar component (printer defect similar image data) by extracting a component similar to the printer defect image (defect similar component) from the input print target original image data. The printer defect similar image data obtained by the extraction of the defect similar component extraction unit 32 is transmitted to the defect similar component subtraction unit 34.

The defect similar component subtraction unit 34 generates image data after printer defect similar component subtraction (print target image data after correction) by subtracting printer defect similar image data (pixel value of the defect similar component) from the input print target original image data. The image data after defect similar component subtraction (print target image data after correction) generated by the defect similar component subtraction unit 34 is transmitted to the printer 12 through the data output unit 36, and printing is performed.

Moreover, the image processing apparatus 16 may include a separation processing unit, a halftoning processing unit, and the like in addition to the configuration shown in FIG. 2. The separation processing unit generates ink amount data for each color in consideration of color matching or image structure quality from the input image data. For example, when the printer 12 uses the ink of four colors of CMYK, image data for each ink color of four types of C, M, Y, and K is generated. Moreover, when the ink of light cyan (LC) and light magenta (LM) is used in addition to the four colors of CMYK, ink amount data for each of six colors (C, M, Y, K, LC, and LM) including LC and LM is generated.

The halftoning processing unit converts an image signal of continuous gradation (for example, 256 gradations of 8 bits per color) of each color into a signal (dot data), which indicates the binary or multi-level dot arrangement, in a pixel unit. Generally, the halftoning processing unit performs processing of converting the multi-gradation image data of the M value (M is an integer of 3 or more) into the data of the N value (N is an integer of 2 or more and less than M). As an example, assuming that the ink jet head is capable of eject the droplet of three droplet sizes (dot sizes) of small droplets, medium droplets, and large droplets, the halftoning processing unit converts the separation image data of each color of multi-gradation (for example, 256 gradations) into signals of four values of "discharge large ink droplets", "discharge medium ink droplets", "discharge small ink droplets", and "no discharge". A dithering method, an error diffusion method, a density patterns method, and the like may be applied as such halftoning processing.

The image processing apparatus 16 may be realized by the combination of hardware and software of one or more computers (may include the peripheral devices).

A program for causing a computer to function as respective units (26 to 36) of the image processing apparatus 16 may be installed in the computer in advance. Otherwise, a magnetic disk, an optical disc, a magneto-optical disc, a memory card, and other computer-readable media (information storage media) in which the program is stored may be provided. In addition, instead of providing the program by storing the program in such storage media as tangible things, it is also possible to provide a program signal as a download service using a communication network, such as the Internet.

<Entire Flow>

Figure 3:
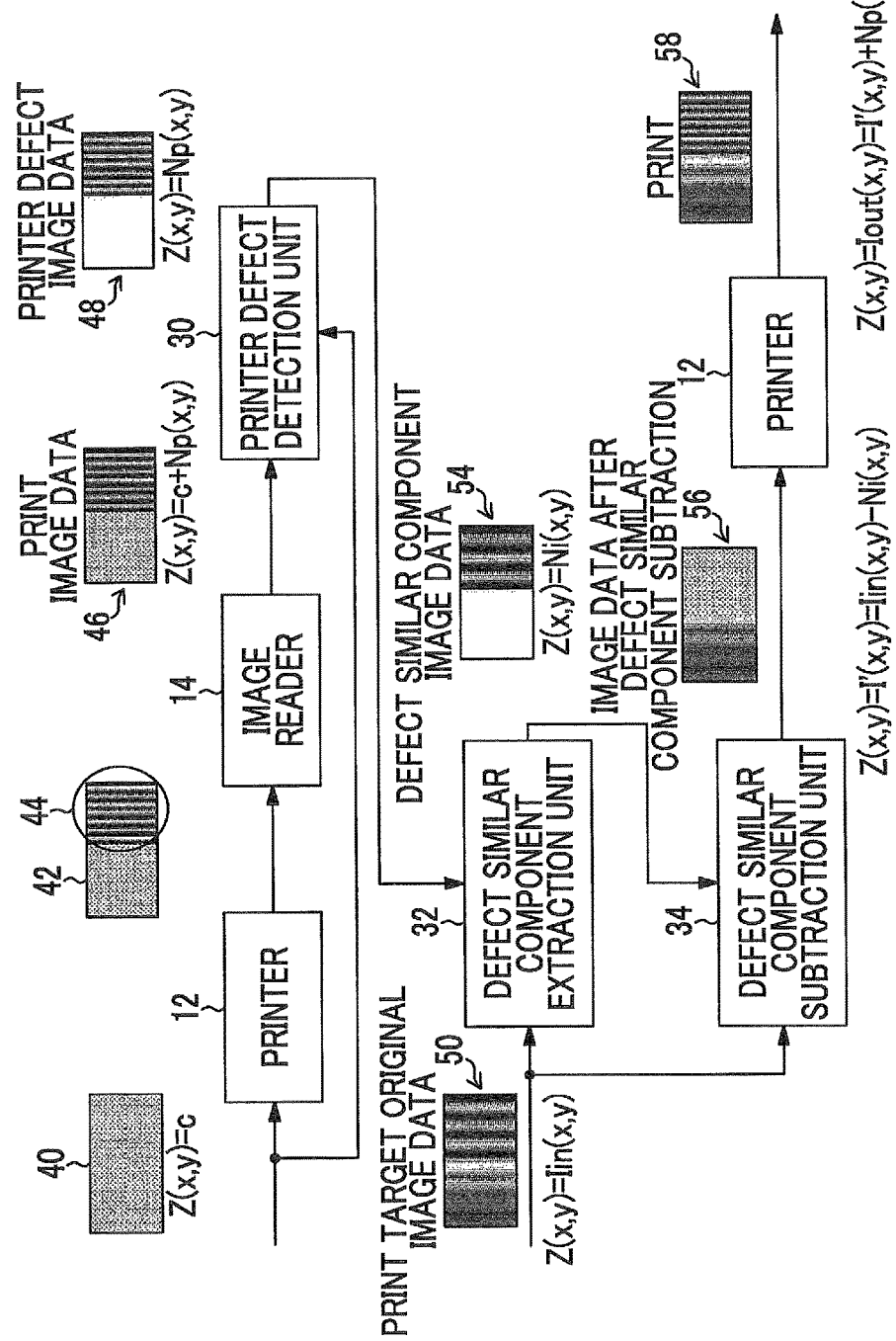
FIG. 3 is an explanatory view showing the flow of the overall process of the printing system according to the present embodiment.

FIG. 3 is an explanatory view showing the flow of the overall process of the printing system according to the present embodiment. The operation in the printing system 10 of this example is largely divided into a printer defect detection processing group for acquiring the information of a printer defect (pre-processing) and a processing group for performing printing with image data after correction by correcting (converting) the image data of the print target based on the acquired information of the printer defect (correction and printing processing).

Figure 4:
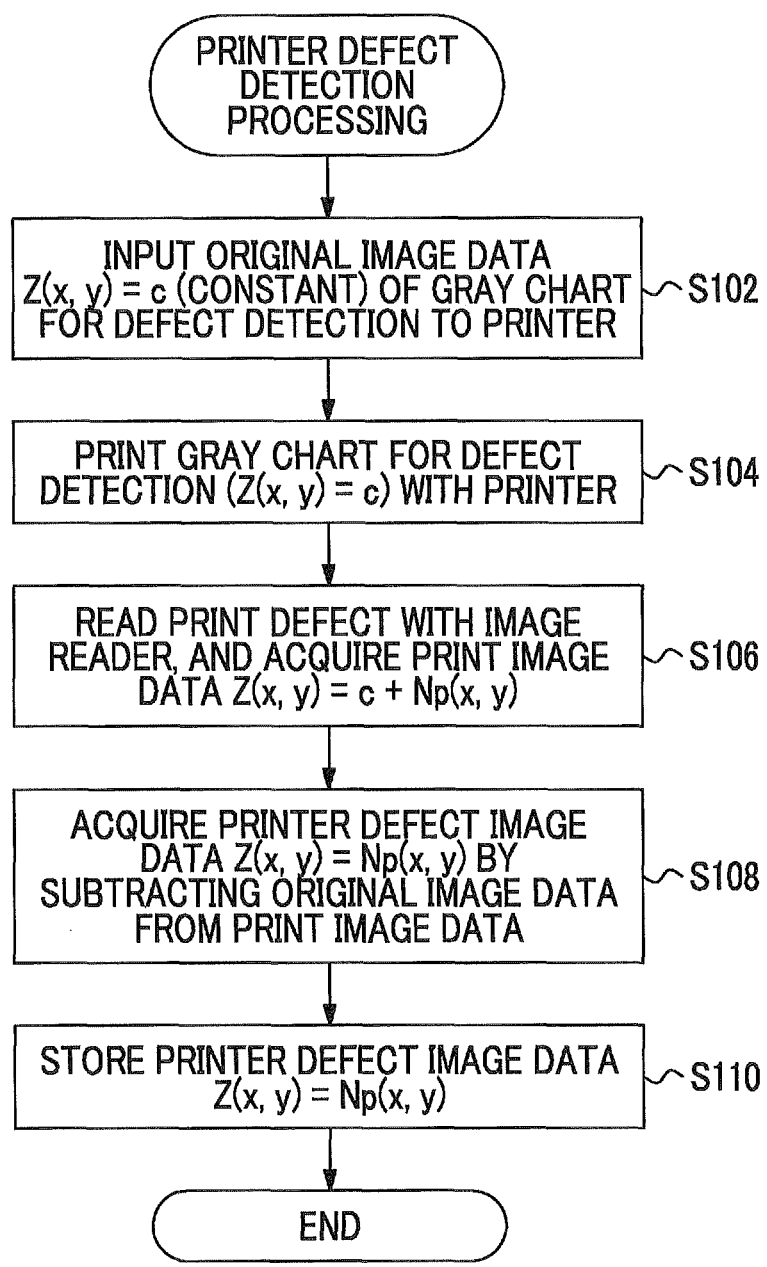
FIG. 4 is a flow chart showing the procedure of printer defect detection equivalent to pre-processing.

FIG. 4 is a flow chart showing the procedure of printer defect detection. As shown in FIGS. 3 and 4, original image data 40 of the gray chart for defect detection is first input to the printer 12 (step S102 in FIG. 4), and the gray chart for defect detection is printed by the printer 12 according to the original image data 40 (step S104; test chart printing step).

The gray chart for defect detection is a test chart of a solid image of uniform density command that is output (printed) by the printer 12 in order to detect the texture due to the printer 12. When the pixel position of a two-dimensional image is expressed as (x, y) and two-dimensional image data is expressed as Z(x, y), the original image data 40 of the gray chart for defect detection is a uniform density image with a fixed image density (gradation) for any position (x, y) in the image, and is expressed as Z(x, y)=c (constant).

Defects (texture), such as streaks due to recording performance (printing characteristics) of the printer 12, are included in a printed material 42 (printed material of a gray chart) output from the printer 12 based on the original image data 40 of the gray chart for defect detection. The region of such a defect due to the printer 12 (printer defect region) is illustrated as reference numeral 44 in FIG. 3. Hereinafter, this is referred to as a "printer defect 44".

The print image of the printed material 42 including the printer defect 44 is read by the image reader 14 to acquire electronic image data (print image data 46) of the print image (step S106 in FIG. 4; test chart reading step). The print image data 46 generated by the image reader 14 is Z(x, y)=c+Np(x, y) which is the superimposition of printer defect image data Np(x, y) corresponding to the printer defect 44 on the original image data (Z(x, y)=c) of the gray chart. That is, the print image data Z(x, y)=c+Np(x, y) of the printed material 42 is obtained from the image reader 14 that has read the printed material 42 of the gray chart.

The print image data obtained by the image reader 14 is input to the printer defect detection unit 30. The original image data 40 of the gray chart is also input to the printer defect detection unit 30, and the printer defect detection unit 30 performs an operation of subtracting the original image data Z(x, y)=c of the gray chart from the print image data 46 [Z(x, y)=c+Np(x, y)], thereby acquiring printer defect image data Z(x, y)=Np(x, y) indicating a defect component (step S108 in FIG. 4; defect image data acquisition step). The printer defect image data acquired in this manner is stored in storage means, such as a memory (step S110 in FIG. 4; defect image data storage step).

Figure 5:
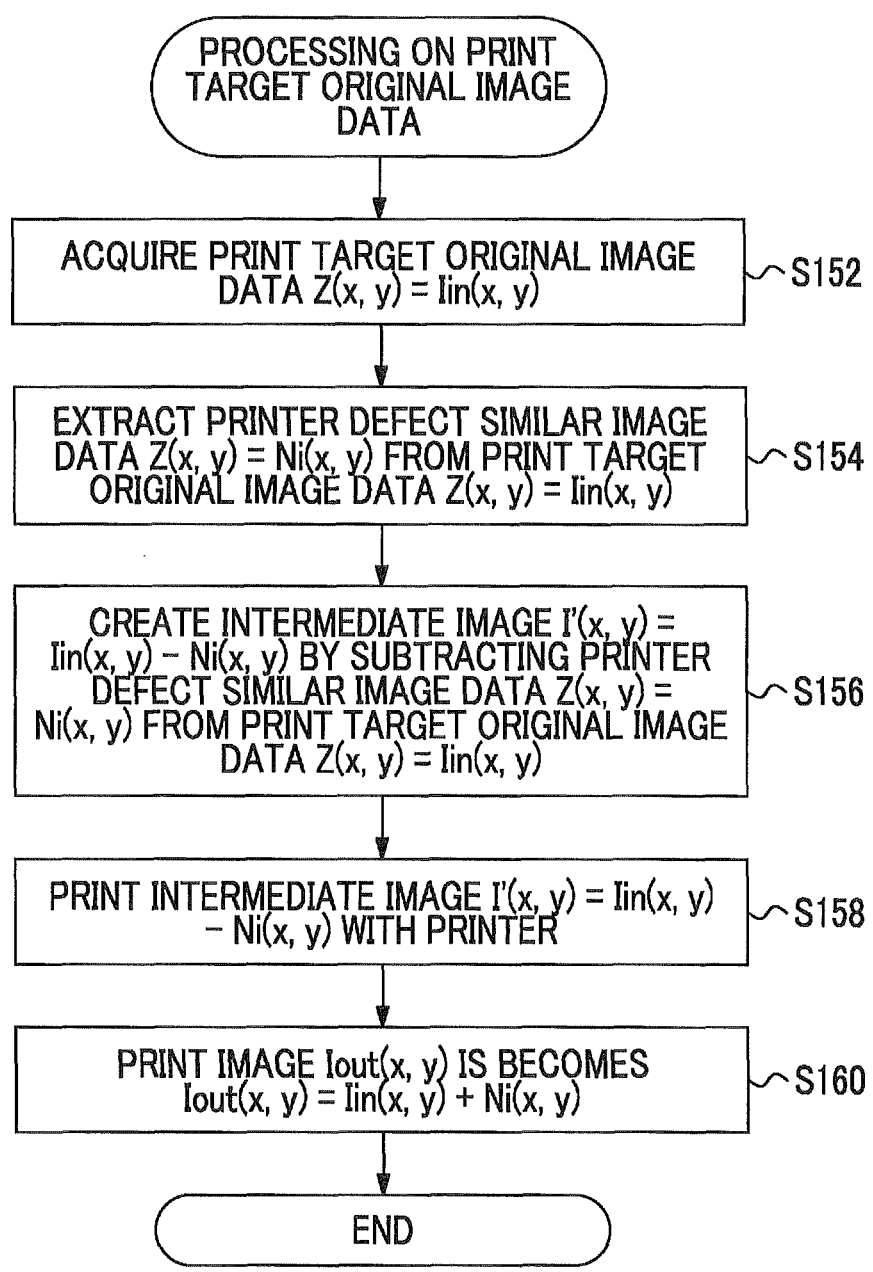
FIG. 5 is a flow chart showing the procedure of performing printing after removing a printer defect similar component from the print target original image data.

Next, the procedure of performing printing after removing a printer defect similar component from the print target original image data will be described with reference to FIG. 5. FIG. 5 is a flow chart of image correction and printing processing performed after the printer defect detection processing described in FIG. 4.

As shown in FIGS. 3 and 5, original image data 50 of a print target is acquired first (step S152 in FIG. 5; print target image data input step). Here, the original image data 50 of the print target is expressed as Z(x, y)=Iin(x, y). The original image data 50 is exported to the image processing apparatus 16 through the original image data input unit 26 described in FIG. 2.

The defect similar component extraction unit 32 of the image processing apparatus 16 performs processing of extracting printer defect similar image data 54 from the original image data 50 of the print target (step S154 in FIG. 5; defect similar component extraction step). The printer defect similar image data 54 is a component which is similar to printer defect image data 48, in the original image data 50 of the print target. Here, the printer defect similar image data is expressed as "Z(x, y)=Ni(x, y)". The procedure of extracting a defect similar component from the original image data 50 will be described later.

Then, the defect similar component subtraction unit 34 creates an intermediate image I'(x, y)=Iin(x, y)−Ni(x, y) by subtracting the printer defect similar image data Z(x, y)=Ni (x, y) from the original image data Z(x, y)=Iin(x, y) (step S156 in FIG. 5; defect similar component subtraction step). The intermediate image I'(x, y) corresponds to image data after defect similar component subtraction (reference numeral 56 in FIG. 3).

The intermediate image I'(x, y) obtained in this way is printed by the printer 12 (step S158 in FIG. 5; printing step). When the print image of a printed material 58 output from the printer 12 is expressed as Iout(x, y), the print image Iout(x, y) is expressed as Iout(x, y)=I'(x, y)+Np(x, y) (step S160 in FIG. 5).

The printed material 58 is produced through the procedure described in FIGS. 3 to 5. The printing process of the printing system 10 may be grasped as a method of producing a printed material.

<Processing of Extracting a Printer Defect Similar Component>

The processing of extracting a similar component of a printer defect from the original image data of the print target comes down to the problem in which a threshold value Th as a criterion of similarity is given from the outside and the function type of image processing Ni(i, j) is searched for so that the evaluation value of the similarity evaluation function E(x, y) is equal to or less than the threshold value Th.

As shown in the following expression, the similarity evaluation function E(x, y) is defined as an expression of evaluation value indicating the similarity between the print target original image data Iin(x, y) and the print image Iout(x, y) that is output from the printer 12 using the image data after correction. In this example, it is defined that the evaluation value indicates a smaller value as the similarity is higher, and it is determined that there is similarity when the evaluation value is equal to or less than the threshold value Th.

$$E(x, y) \equiv E(Iin(x, y), Iout(x, y))$$
$$= E(Iin(x, y), Iin(x, y) - Ni(x, y) + Np(x, y)) \leq Th$$

When extracting a defect similar component, there may be a case where the position of a printer defect caused by the printer 12 matches the position of a printer defect similar component in the original image data and a case where the position of a printer defect caused by the printer 12 does not match the position of a printer defect similar component in the original image data.

Figure 6A:
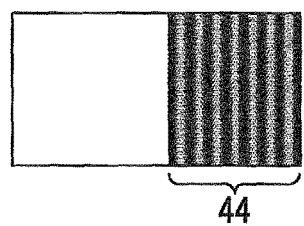
FIG. 6A is a schematic diagram illustrating a part of a printer defect.
Figure 6B:
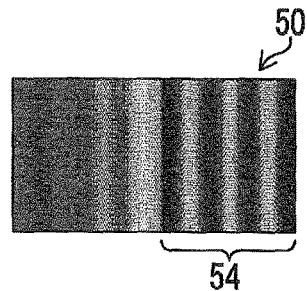
FIG. 6B is a schematic diagram illustrating a part of print target original image data.

FIG. 6A is a schematic diagram illustrating a part of a printer defect caused by the printer 12, and FIG. 6B is a schematic diagram illustrating a part of print target original image data. FIGS. 6A and 6B show a case where the position of the printer defect 44 matches the position of the defect similar component (printer defect similar image data 54) in the print target original image data 50.

Figure 7A:
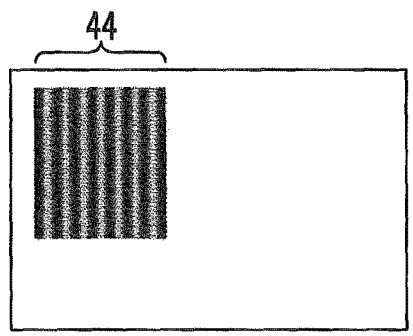
FIG. 7A is a schematic diagram illustrating another part of the printer defect.
Figure 7B:
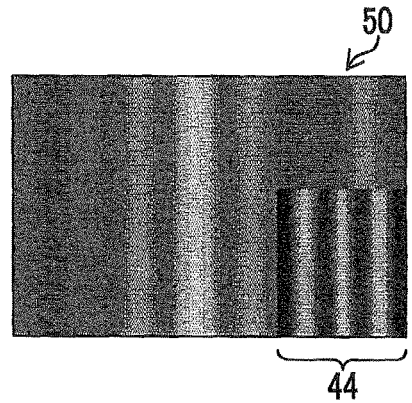
FIG. 7B is a schematic diagram illustrating another part of the print target original image data.

FIG. 7A is a schematic diagram illustrating another part of the printer defect caused by the printer 12, and FIG. 7B is a schematic diagram illustrating another part of the print target original image data. FIGS. 7A and 7B show a case where the position of the printer defect 44 does not match the position of the defect similar component (printer defect similar image data 54) in the print target original image data 50.

In general, it is thought that the position of the printer defect 44 does not match the position of a defect similar component in the print target original image data 50 in many cases. However, in order to simplify explanation herein, a case where the position of a printer defect matches the position of a defect similar component in the print target image data will be described first.

<Example 1 of the Defect Similar Component Extraction Procedure>

As a simplest example of the image processing Ni(i, j) and the similarity evaluation function E, a processing operation to determine that there is similarity when the absolute value of the simple difference between pieces of image data is small will be described. In a method of calculating the simple difference, the image processing Ni(x, y) is set as processing called Ni(x, y)=Np(x, y). This corresponds to correcting (replacing) the printer defect Np(x, y) completely in the image processing Ni(x, y).

In this case, the intermediate image I'(x, y), the output image (print image) Iout(x, y) of the printer 12, and the similarity evaluation function E0 are defined as follows.

$$I'(x,y)=Iin(x,y)-Ni(x,y)=Iin(x,y)-Np(x,y)$$

$$Iout(x,y)=I'(x,y)+Np(x,y)=Iin(x,y)$$

$$E0(Iin(x,y),Iout(x,y))=(\Sigma Abs(Iin(x,y)-Iout(x,y)))/N$$

"Σ" in the expression indicates a sum for all printer pixels Np(k, 1), and "Abs" indicates an absolute value. In addition, "N" indicates the number of printer pixels. That is, the similarity evaluation function E0 is calculated by calculating the absolute value of the difference between the original image data Iin(x, y) of the print target and the print image data Iout(x, y) of the printed material, which is printed out, for each pixel and dividing the sum for all pixels by the total number of pixels N. This means the average value of the absolute values of the differences for respective pixels.

When the similarity evaluation function E0 is calculated, it becomes E0(Iin(x, y), Iout(x, y))≡[ΣAbs(Iin(x, y)−Iout(x, y))]/N=0. When the threshold value Th is an arbitrary number equal to or greater than "0", E0 is always equal to or less than the threshold value Th. This corresponds to correcting a printer defect completely in image processing.

<Example 2 of the Defect Similar Component Extraction Procedure>

Next, a and b satisfying the deformation relationship, in which a defect similar component in the print target original image data is "a" times in the x direction and "b" times in the y direction, are searched for. In addition, a and b are arbitrary positive numbers. In this example, it is assumed that the x direction is a main scanning direction (longitudinal direction of a line head) in a single pass method and the y direction is a paper transport direction (sub-scanning direction).

Figure 8:
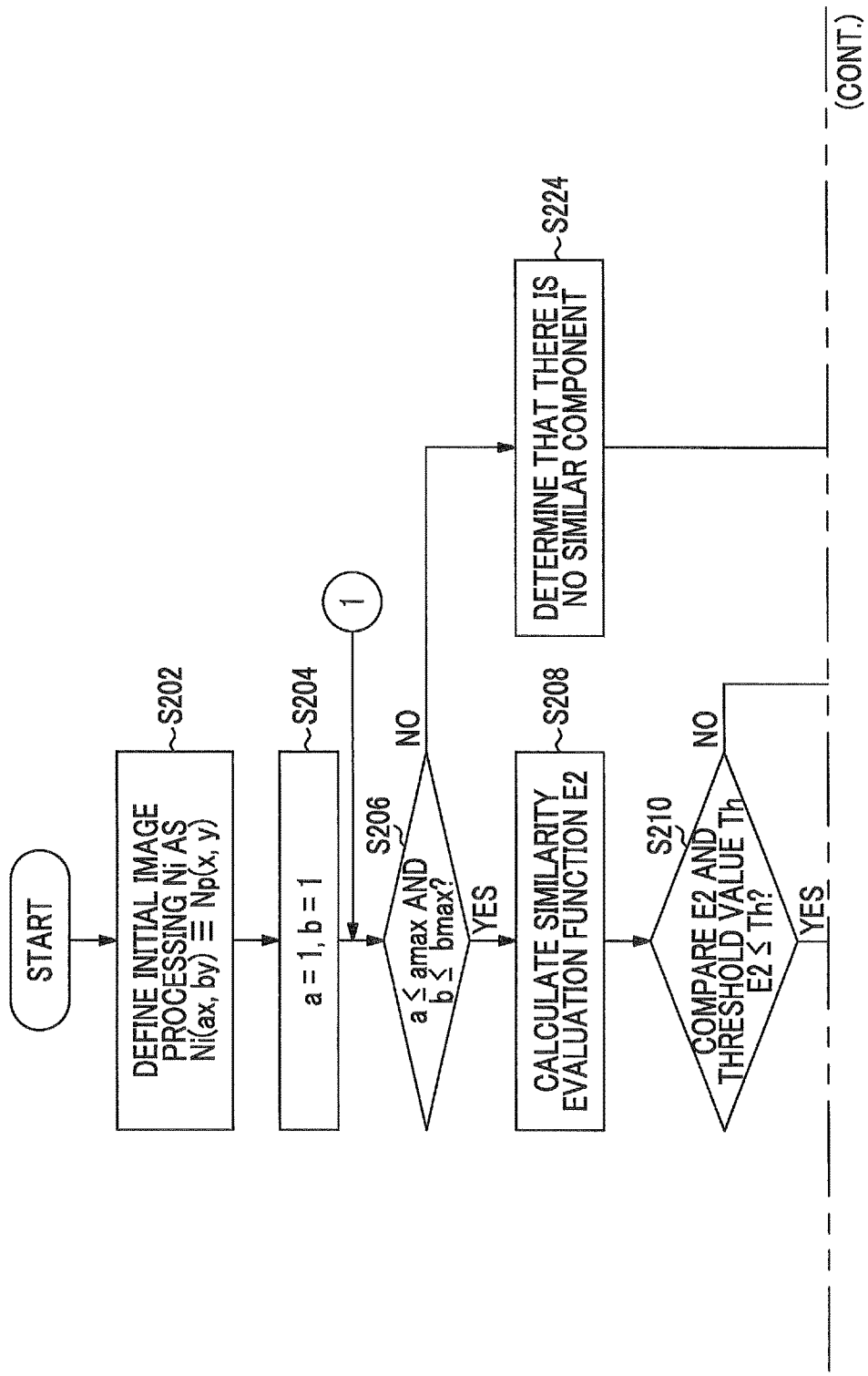
FIG. 8 is a flow chart showing the procedure of extracting a similar component having a shape of "a" times in the x direction and "b" times in the y direction.

FIG. 8 is a flow chart showing the procedure of extracting a similar component having a shape of "a" times in the x direction and "b" times in the y direction. First, initial image processing Ni for a similar region is defined as Ni(ax, by)≡Np(x, y) (step S202). Then, a=1 and b=1 are set as the initial values of a and b (step S204).

Then, it is determined whether or not a and b are equal to or less than the maximum magnification factor values amax and bmax given from the outside (step S206). amax and bmax are numerical values set as upper limits that the variables a and b can take, and amax and bmax may be the same value or may be different values. When a≤amax and b≤bmax are satisfied, the process proceeds to step S208 to calculate a similarity evaluation function E2.

The similarity evaluation function E2 is defined as follows.

First, Δ(x, y)=Iin(x, y)−Ni(x, y) is assumed.

Δ(x, y) indicates components of the print target original image data excluding a printer defect similar component. The print image Iout(x, y) that is printed out is expressed as follows using Δ(x, y).

$$Iout(x,y)=Iin(x,y)-Ni(x,y)+Np(x,y)=\Delta(x,y)+Np(x,y)=\Delta(x,y)+Ni(ax,by)$$

Figure 9A:
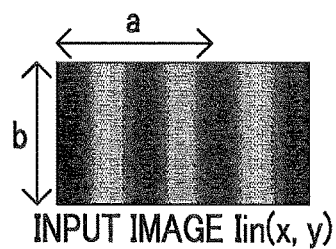
FIG. 9A is an explanatory diagram showing an input image Iin(x, y)
Figure 9B:
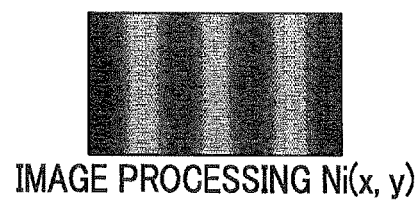
FIG. 9B is an explanatory diagram showing image processing Ni(x, y)
Figure 9C:
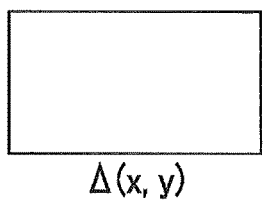
FIG. 9C is an explanatory diagram showing a difference image Δ(x, y)
Figure 9D:
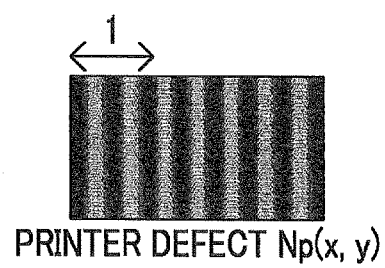
FIG. 9D is an explanatory diagram showing a printer defect Np(x, y)
Figure 9E:
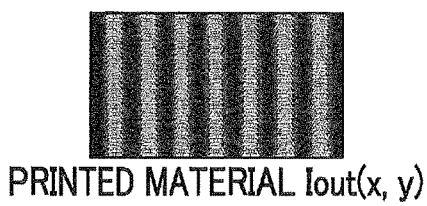
FIG. 9E is an explanatory diagram showing a print image Iout(x, y) of a printed material.

For reference, FIGS. 9A to 9E show schematic diagrams. FIG. 9A shows an input image Iin(x, y), FIG. 9B shows image processing Ni(x, y), and FIG. 9C shows Δ(x, y), FIG. 9D shows a printer defect Np(x, y), and FIG. 9E shows a print image Iout(x, y) of a printed material.

In addition, the similarity evaluation function E2(Iin(x, y), Iout(x, y), a, b) is defined by the following expression.

$$E2(Iin(x, y), Iout(x, y), a, b) \equiv \left[\sum \text{Abs}(Iin(ax, by) - Iout(x, y))\right]/N$$
$$= \left[\sum \text{Abs}\{\Delta(ax, by) + Ni(ax, by) - (\Delta(x, y) + Ni(ax, by))\}\right]/N$$
$$= \left[\sum \text{Abs}\{\Delta(ax, by) - (\Delta(x, y)\}\right]/N$$

This expression is obtained by modeling that the shapes satisfying the deformation relationship of "a" times in the x direction and "b" times in the y direction are determined to be similar. A possibility that Th satisfying E2≤Th will be present increases as the value of Abs(Δ(ax, by)−Δ(x, y)) decreases, that is, as the amount of components other than the printer defect similar components decreases.

After the similarity evaluation function E2 is calculated in step S208 in FIG. 8, the calculated evaluation value is compared with the threshold value Th set in advance (step S210). In the case of E2≤Th, it is determined that the similar component Ni(ax, by) has been extracted (step S212), and the process ends.

On the other hand, when it is determined that the evaluation value E2 exceeds the threshold value Th in step S210, the values of a and b are changed (steps S214 to S218), and the process returns to step S206. That is, in step S214, the value of a is increased by 0.1 (step S214). Then, it is determined whether or not the changed value of a is equal to or less than amax (step S216). When it is determined that the value of a is equal to or less than amax in step S216 (in the case of Yes determination in step S216), the process returns to step S206. On the other hand, when the value of a exceeds amax in step S216 (in the case of No determination in step S216), the process proceeds to step S218 to increase the value of b by 0.1. Then, it is determined whether or not the changed value of b is equal to or less than bmax (step S220). When it is determined that the value of b is equal to or less than bmax in step S220 (in the case of Yes determination in step S220), the value of a is returned to "1" that is the initial value (step S222), and the process returns to step S206. The similarity evaluation function E2 is calculated while changing a and b sequentially in units of 0.1 by the loop of steps S206 to S222, and the similarity evaluation function E2 is compared with the threshold value Th.

When a combination of a and b, which are evaluation values equal to or less than the threshold value Th, is found in the course of the loop, Yes determination is made in step S210 to extract a defect similar component (step S212), and the process ends.

When evaluation values equal to or less than the threshold value Th are not obtained even if a and b are changed up to amax and bmax, No determination is eventually made in step S220. As a result, No determination is also made in step S206. In this case, the process proceeds to step S224 to determine that there is no defect similar component, and the process ends.

In addition, although the amount of increase unit of each value of a and b is set to "0.1" in this example, the amount of increase unit is not limited to 0.1, and an appropriate amount may be set. In addition, it may also be determined that there is similarity between similar shapes by changing a and b simultaneously by the equal amount.

<Example 3 of the Defect Similar Component Extraction Procedure>

As a modification of the above-described "example 2 of the defect similar component extraction procedure", a method of searching for the minimum of the similarity evaluation function E2 may be adopted when searching for a and b satisfying the deformation relationship of "a" times in the x direction and "b" times in the y direction.

Figure 10:
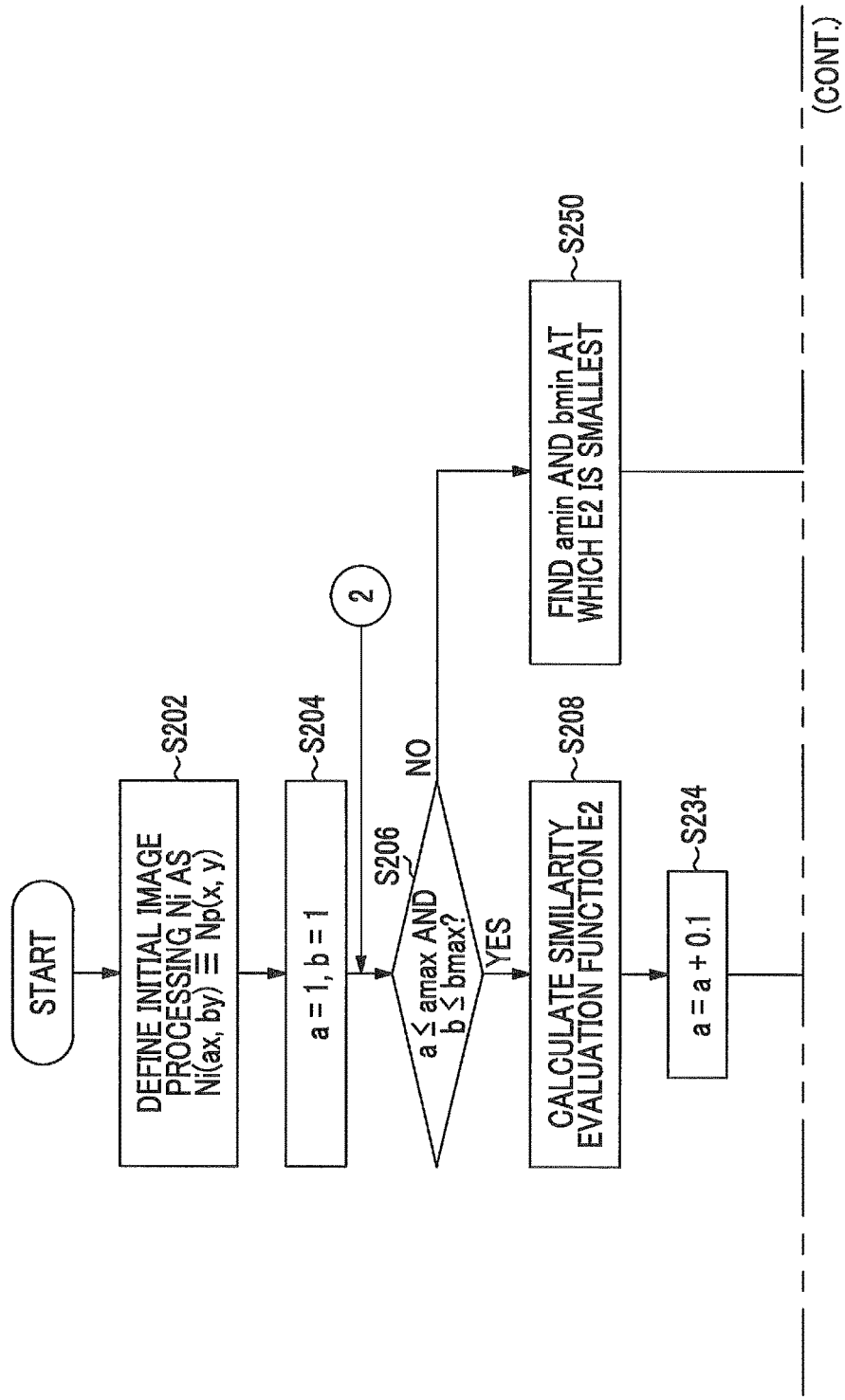
FIG. 10 is a flow chart showing another example of the procedure of extracting a similar component having a shape of "a" times in the x direction and "b" times in the y direction.

FIG. 10 is a flow chart showing another example of the procedure of extracting a similar component having a shape of "a" times in the x direction and "b" times in the y direction. In FIG. 10, the same or similar steps as in the example of FIG. 8 are denoted by the same step numbers, and explanation thereof will be omitted.

In the flow chart shown in FIG. 10, steps S202 to S208 are the same as those in the example of FIG. 8.

After step S208 in FIG. 10, the process proceeds to step S234 to increase the value of a by 0.1. Then, it is determined whether or not the changed value of a is equal to or less than amax (step S236). When it is determined that the value of a is equal to or less than amax in step S236 (in the case of Yes determination in step S213), the process returns to step S206. On the other hand, when the value of a exceeds amax in step S236 (in the case of No determination in step S236), the process proceeds to step S238 to increase the value of b by 0.1. Then, it is determined whether or not the changed value of b is equal to or less than bmax (step S240). When it is determined that the value of b is equal to or less than bmax in step S240 (in the case of Yes determination in step S240), the value of a is returned to "1" that is the initial value (step S242), and the process returns to step S206. The similarity evaluation function E2 is calculated while changing a and b sequentially in units of 0.1 by the loop of steps S206 to S242.

When the value of b exceeds bmax in step S240, No determination is made in step S240. As a result, determination in step S206 is also No. In this case, the process proceeds to S250. In step S250, amin and bmin, at which the evaluation value E2 calculated for each combination of a and b is a minimum value, are extracted.

Then, the minimum value of the evaluation value calculated for the combination of a and b is compared with the threshold value Th (step S252). When the minimum value of the evaluation value is equal to or less than the threshold value Th, a defect similar component is extracted (step S254), and the process ends.

On the other hand, when the minimum value of the evaluation value exceeds the threshold value Th in step S252, it is determined that there is no defect similar component (step S256), and the process ends.

<Example 4 of the Defect Similar Component Extraction Procedure>

When extracting a defect similar component, a method of searching for θ when a similar component of an image has rotated in a θ radian direction with respect to a printer defect may also be adopted without being limited to the examples 1 to 3 described above.

Figure 11:
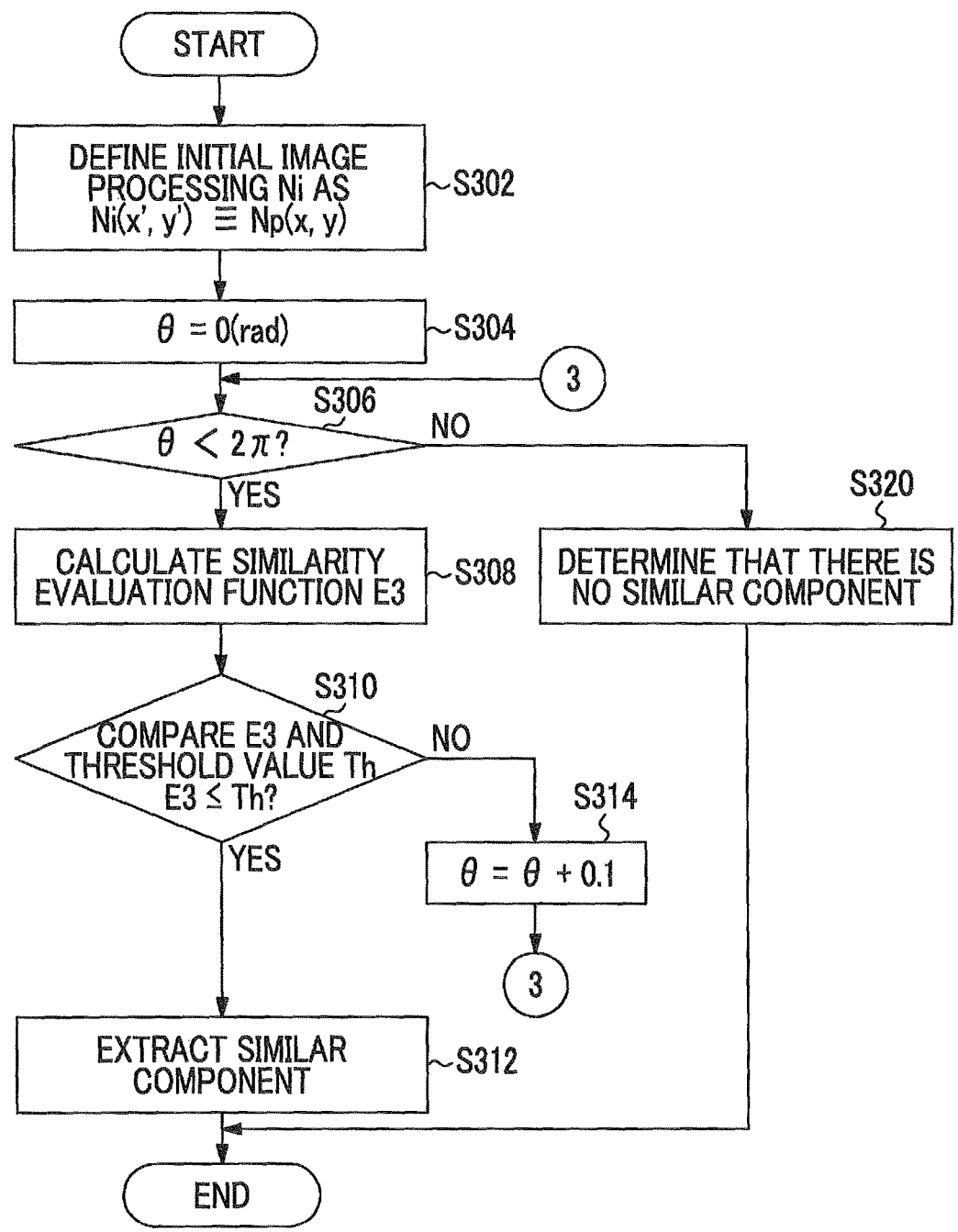
FIG. 11 is a flow chart showing an example of the process of determining a similar region using rotation transformation.

FIG. 11 is a flow chart showing an example of the process of determining a similar region using rotation transformation. Mapping of rotation of θ radian within the image plane (transformation expression) is expressed as in the following expression.

$$x' = x \cos\theta - y \sin\theta$$

$$y' = x \sin\theta + y \cos\theta$$

First, the initial image processing Ni is defined as Ni(x', y')≡Np(x, y) (step S302). θ=0 (radian) is set as the initial value of θ (step S304).

Then, it is determined whether or not θ is less than the maximum rotation angle θmax (here, θmax is set to 2π) (step S306). In addition, θmax is a numerical value set as an upper limit that the variable θ can take. When θ<2π is satisfied, the process proceeds to step S308 to calculate a similarity evaluation function E3. The similarity evaluation function E3 is defined as follows.

First, Δ(x', y')≡Iin(x', y')−Ni(x', y') is assumed. Δ(x', y') indicates a component other than the printer defect similar components.

The print image Iout(x, y) that is printed out is expressed as follows.

$$Iout(x,y) = Iin(x,y) - Ni(x,y) + Np(x,y) = \Delta(x,y) + Np(x,y) = \Delta(x,y) + Ni(x',y')$$

Figure 12A:
FIG. 12A is an explanatory diagram showing an input image Iin(x, y)
Figure 12B:
FIG. 12B is an explanatory diagram showing image processing Ni(x, y)
Figure 12C:
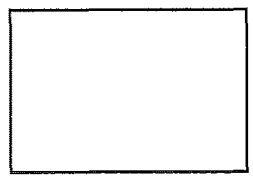
FIG. 12C is an explanatory diagram showing a difference image Δ(x, y)
Figure 12D:
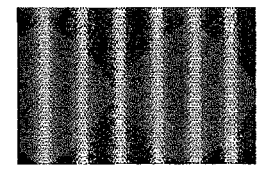
FIG. 12D is an explanatory diagram showing a printer defect Np(x, y)
Figure 12E:
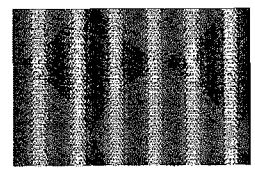
FIG. 12E is an explanatory diagram showing a print image Iout(x, y) of a printed material.

For reference, FIGS. 12A to 12E show schematic diagrams. FIG. 12A shows an input image Iin(x, y), FIG. 12B shows image processing Ni(x, y), and FIG. 12C shows Δ(x, y), FIG. 12D shows a printer defect Np(x, y), and FIG. 12E shows a print image Iout(x, y) of a printed material.

In addition, the similarity evaluation function E3(Iin(x, y), Iout(x, y), θ) is defined by the following expression.

$$E3(Iin(x, y), Iout(x, y), \theta) \equiv \left[\sum \text{Abs}(Iin(x', y') - Iout(x, y))\right]/N$$
$$= \left[\sum \text{Abs}\{\Delta(x', y') + Ni(x', y') - (\Delta(x, y) + Ni(x', y'))\}\right]/N$$
$$= \left[\sum \text{Abs}\{\Delta(x', y') - (\Delta(x, y))\}\right]/N$$

This expression is obtained by modeling that the shapes rotated within the image plane are determined to be similar. A possibility that Th satisfying E3≤Th will be present increases as the value of Abs(Δ(x', y')−(x, y)) decreases, that is, as the amount of components other than the printer defect similar components decreases.

After the similarity evaluation function E3 is calculated in step S308 in FIG. 11, the calculated evaluation value is compared with the threshold value Th set in advance (step S310). When E3≤Th is satisfied, it is determined that the similar component Ni(x, y) has been extracted (step S312), and the process ends.

On the other hand, when it is determined that the evaluation value E3 exceeds the threshold value Th in step S310, the value of θ is increased by 0.1 (step S314), and the process returns to step S306. The similarity evaluation function E3 is calculated while changing θ sequentially in units of 0.1 by the loop of steps S306 to S314, and the similarity evaluation function E3 is compared with the threshold value Th.

When θ which is an evaluation value equal to or less than the threshold value Th is found in the course of the loop, Yes determination is made in step S310 to extract a defect similar component (step S312), and the process ends.

When an evaluation value equal to or less than the threshold value Th is not obtained even if θ is changed up to 2π, No determination is eventually made in step S306. In this case, the process proceeds to step S320 to determine that there is no defect similar component, and the process ends.

In addition, although the amount of increase unit of the value of θ is set to "0.1" in this example, the amount of increase unit is not limited to 0.1, and an appropriate amount may be set.

<Handling when the Position of a Printer Defect does not Match the Position of a Printer Defect Similar Component>

Figure 13A:
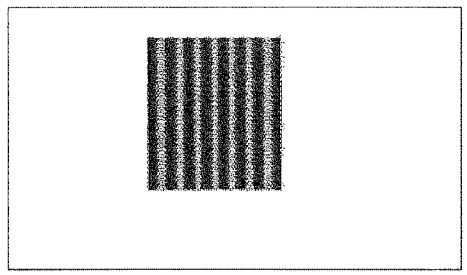
FIG. 13A is an explanatory diagram illustrating a printer defect region Np(x, y) due to a printer.
Figure 13B:
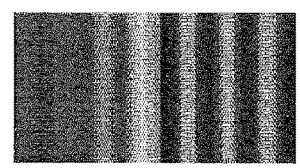
FIG. 13B is an explanatory diagram illustrating the print target original image data.

FIGS. 13A and 13B are explanatory views when the position of a printer defect does not match the position of a printer defect similar component. FIG. 13A shows a printer defect Np(x, y) due to a printer, and FIG. 13B shows print target original image data.

As shown in the drawings, when the position of a printer defect (FIG. 13A) does not match the position of a printer defect similar component (FIG. 13B), the print target original image data Iin(x, y) is scanned while changing the position in the x direction as shown in FIGS. 14A to 14D in the printer defect region Np(x, y), and a position at which the similarity evaluation function E(x, y)=E(Iin(x, y), Iout(x, y)) Th is searched for.

When all of the original image data Iin(x, y) are scanned and there is no position satisfying the above-described conditions, it is determined that there are no similar components.

Figure 14A:
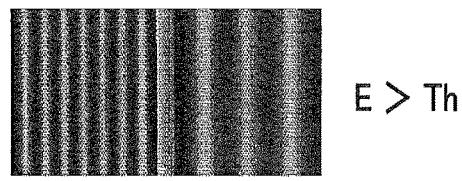
FIGS. 14A to 14D are explanatory diagrams of a processing method when the position of a printer defect does not match the position of a similar region of the print target original image data.
Figure 14B:
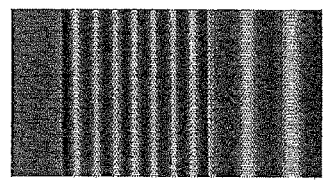
Figure 14C:
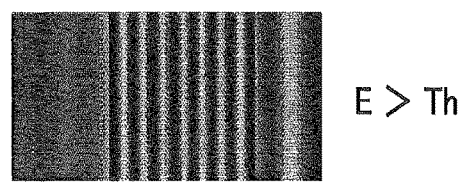
Figure 14D:
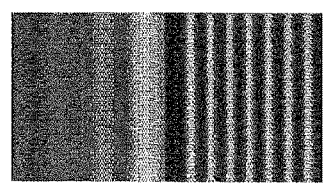
Figure 15:
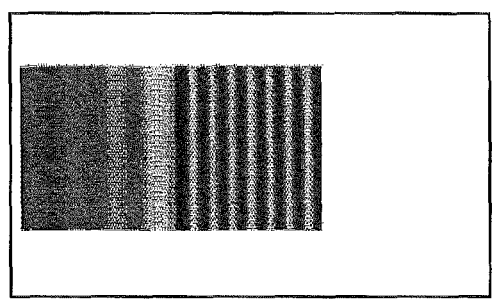
FIG. 15 is a diagram showing an example of a printed material obtained in the present embodiment.

On the other hand, when there is a position at which the evaluation value E of the similarity evaluation function is equal to or less than the threshold value Th, for example, when E≤Th is satisfied at the position shown in FIG. 14D, a target image is printed on a print medium (paper) in a layout shown in FIG. 15.

Thus, when the presence of a defect similar component in the print target image data is determined while changing the relative positional relationship between the printer defect and the print target image data and there is a defect similar component, processing of changing the image position (layout) at the time of printing so that the positional relationship between the printer defect and the defect similar component in the print target image is satisfied is performed.

In this manner, it is possible to output a print image similar to the print target original image data by using the texture generated by the printer defect.

<Advantages of the Embodiment>

According to the present embodiment, a region similar to the detected printer defect is extracted from the original image data of the print target, and the pixel value of the region similar to the printer defect is subtracted from the original image data of the print target. Then, the printer defect is added onto the print image at the time of printing by performing printing according to the image data after subtraction using the printer 12.

That is, a part of the defect similar component of the original image data is replaced with an image (texture) of the printer defect at the time of printing by subtracting the pixel value of the "similar region" from the print target original image data and inputting the image data after subtraction to the printer. Therefore, it is possible to eventually reproduce an image similar to the original image data.

According to the present embodiment, the image processing apparatus 16 creates an output image (print image) of the printer 12 by simulation, and processing of correcting the print target original image data (processing of subtracting the pixel value of the defect similar component) is performed on condition that the similarity is evaluated using a similarity evaluation function and the evaluated similarity is a high similarity comparable to or greater than the similarity indicated by the threshold value Th. In this manner, it is possible to reproduce an image similar to the original image data by lowering the visibility of a defect generated by the printer.

According to the present embodiment, when it is possible to reproduce an image similar to the original image data, it is possible to avoid interruption of printing, such as head maintenance of the printer 12, and accordingly it is possible to improve the print productivity.

<Modification 1>

In the embodiment described above, examples using the simple difference, deformation transformation of "a" times in the x direction and "b" times in the y direction, and rotation transformation when extracting a defect similar component have been explained. However, the present invention is not limited to these illustrated transformations (mappings). For example, it is also possible to evaluate the similarity using a mapping that is an appropriate combination of these various kinds of transformation processing. In addition, a similar region may also be extracted by performing a plurality of extraction methods sequentially, for example, by performing processing of extracting a similar region by searching for the shape of "a" times and "b" times and processing of extracting a similar region by rotation step by step.

<Modification 2>

In addition, when extracting a defect similar component, the similarity may be evaluated by introducing an evaluation function to perform evaluation regarding the approximation to the Root Mean Square (RMS) granularity without being limited to the similarity of the line structure, such as streaks.

<Modification 3>

In the above embodiment, the streaky texture has been described as an example of a printer defect. However, the applicable range of the present invention is not limited to this example, and density unevenness caused by distortion of the printing cylinder or the like may be similarly treated as a printer defect.

In the embodiment of the present invention described above, constituent components may be appropriately changed, added, and deleted in a range not departing from the spirit and scope of the present invention. The present invention is not limited to the embodiment described above, and various modifications may be made within the technical idea of the present invention by those skilled in the art.

What is claimed is:

1. An image processing apparatus configured to correct image data for printing, comprising:
   a defect image data acquisition unit configured to acquire defect image data indicating a texture of an image defect appearing on a printed material due to an abnormal discharge of a nozzle of an inkjet printer;
   a print target image data input unit configured to acquire print target original image data to be printed by the inkjet printer;
   a defect similar component extraction unit configured to extract a defect similar component, which is a pixel value of a region that is similar to the defect image data, from the print target original image data; and
   a defect similar component subtraction unit configured to subtract the defect similar component from the print target original image data and thereby generate an intermediate image,
   wherein image processing apparatus causes the inkjet printer to print the intermediate image.

2. The image processing apparatus according to claim 1, wherein the defect image data acquisition unit includes a defect detection unit configured to generate the defect image data by detecting the image defect from print image data obtained by reading a print image of a test chart printed by the inkjet printer.

3. The image processing apparatus according to claim 2, wherein the defect detection unit obtains the defect image data by subtracting an image data component of the test chart from the print image data.

4. The image processing apparatus according to claim 1, wherein the defect similar component extraction unit determines whether or not the defect similar component is present by calculating an evaluation value according to a similarity evaluation function defined in advance and comparing the calculated evaluation value with a threshold value set in advance.

5. The image processing apparatus according to claim 2, wherein the defect similar component extraction unit determines whether or not the defect similar component is present by calculating an evaluation value according to a similarity evaluation function defined in advance and comparing the calculated evaluation value with a threshold value set in advance.

6. The image processing apparatus according to claim 3, wherein the defect similar component extraction unit determines whether or not the defect similar component is present by calculating an evaluation value according to a similarity evaluation function defined in advance and comparing the calculated evaluation value with a threshold value set in advance.

7. The image processing apparatus according to claim 1, wherein the defect similar component extraction unit extracts, as the defect similar component, an image component, which has a deformed shape of "a" times in a first direction and "b" times in a second direction perpendicular to the first direction within an image plane with respect to a defect image portion indicated by the defect image data wherein a and b are positive numbers.

8. The image processing apparatus according to claim 2, wherein the defect similar component extraction unit extracts, as the defect similar component, an image component, which has a deformed shape of "a" times in a first direction and "b" times in a second direction perpendicular to the first direction within an image plane with respect to a defect image portion indicated by the defect image data wherein a and b are positive numbers.

9. The image processing apparatus according to claim 3, wherein the defect similar component extraction unit extracts, as the defect similar component, an image component, which has a deformed shape of "a" times in a first direction and "b" times in a second direction perpendicular to the first direction within an image plane with respect to a defect image portion indicated by the defect image data wherein a and b are positive numbers.

10. The image processing apparatus according to claim 1, wherein the defect similar component extraction unit extracts an image component, which has a shape obtained by rotating a defect image portion indicated by the defect image data within the image plane, as the defect similar component.

11. The image processing apparatus according to claim 2, wherein the defect similar component extraction unit extracts an image component, which has a shape obtained by rotating a defect image portion indicated by the defect image data within the image plane, as the defect similar component.

12. The image processing apparatus according to claim 3, wherein the defect similar component extraction unit extracts an image component, which has a shape obtained by rotating a defect image portion indicated by the defect image data within the image plane, as the defect similar component.

13. The image processing apparatus according to claim 1, wherein the defect similar component extraction unit determines whether or not the defect similar component is present by changing relative positional relationship between a defect region of the defect image data and the print target original image data.

14. The image processing apparatus according to claim 2, wherein the defect similar component extraction unit determines whether or not the defect similar component is present by changing relative positional relationship between a defect region of the defect image data and the print target original image data.

15. The image processing apparatus according to claim 3, wherein the defect similar component extraction unit determines whether or not the defect similar component is present by changing relative positional relationship between a defect region of the defect image data and the print target original image data.

16. An image processing method of correcting image data for printing, comprising:
a defect image data acquisition step of acquiring defect image data indicating a texture of an image defect appearing on a printed material due to an abnormal discharge of a nozzle of an inkjet printer;
a print target image data input step of acquiring print target original image data to be printed by the inkjet printer;
a defect similar component extraction step of extracting a defect similar component, which is a pixel value of a region that is similar to the defect image data, from the print target original image data;
a defect similar component subtraction step of subtracting the defect similar component from the print target original image data and thereby generate an intermediate image; and
causing the inkjet printer to print the intermediate image.

17. A non-transitory computer-readable recording medium having a program embedded thereon causing a computer to implement an image processing function of correcting image data for printing, the program causing the computer to function as:
a defect image data acquisition unit configured to acquire defect image data indicating a texture of an image defect appearing on a printed material due to an abnormal discharge of a nozzle of an inkjet printer;
a print target image data input unit configured to acquire print target original image data to be printed by the inkjet printer;
a defect similar component extraction unit configured to extract a defect similar component, which is a pixel value of a region that is similar to the defect image data, from the print target original image data; and
a defect similar component subtraction unit configured to subtract the defect similar component from the print target original image data and thereby generate an intermediate image; and
wherein the inkjet printer is caused to print the intermediate image.

18. A printing system comprising:
the image processing apparatus according to claim 1; and
an inkjet printer,
wherein printing of the inkjet printer is performed based on the intermediate image data obtained by subtracting the defect similar component from the print target original image data using the defect similar component subtraction unit of the image processing apparatus.

19. The printing system according to claim 18, further comprising:
an image reader configured to read a print image of a printed material printed by the printer,
wherein the defect image data is generated from print image data obtained by reading a print image of a test chart printed by the printer using the image reader.

20. A method of producing a printed material, comprising:
a test chart printing step of printing a test chart using an inkjet printer;
a print image data acquisition step of reading a print image of the test chart, which has been printed in the test chart printing step, using an image reader to acquire print image data of the read print image;
a defect image data acquisition step of acquiring defect image data, which indicates a texture of an image defect appearing on a printed material due to an abnormal discharge of a nozzle of the inkjet printer, from the printed image data;
a print target image data input step of acquiring print target original image data to be printed by the inkjet printer;
a defect similar component extraction step of extracting a defect similar component, which is a pixel value of a region that is similar to the defect image data, from the print target original image data;
a defect similar component subtraction step of subtracting the defect similar component from the print target original image data and thereby generate an intermediate image; and
a printing step of performing printing of the intermediate image using the inkjet printer.

* * * * *